United States Patent [19]
Markham

[11] Patent Number: 5,865,146
[45] Date of Patent: Feb. 2, 1999

[54] BOUNCING PET TOY

[75] Inventor: Joseph P. Markham, Arvada, Colo.

[73] Assignee: Bounce, Inc., Golden, Colo.

[21] Appl. No.: 41,218

[22] Filed: Mar. 12, 1998

[51] Int. Cl.[6] .................................................. A01K 29/00
[52] U.S. Cl. ............................................................ 119/707
[58] Field of Search .................................... 119/702, 707, 119/708, 709, 710, 711

[56] References Cited

U.S. PATENT DOCUMENTS

| | | |
|---|---|---|
| D. 188,179 | 6/1960 | Tay . |
| D. 234,789 | 4/1975 | Rosenberg ........................... D34/15 C |
| D. 234,790 | 4/1975 | Rosenberg ........................... D34/15 A |
| D. 256,958 | 9/1980 | Markham ................................ D30/99 |
| D. 307,339 | 4/1990 | Markham et al. ..................... D30/160 |
| D. 308,122 | 5/1990 | Markham et al. ..................... D30/160 |
| D. 344,161 | 2/1994 | Markham .............................. D30/160 |
| D. 349,786 | 8/1994 | Markham .............................. D30/160 |
| 1,006,182 | 10/1911 | Cousin . |
| 1,534,964 | 4/1925 | Kahnweiler . |
| 3,071,476 | 1/1963 | Werft et al. .............................. 99/135 |
| 3,104,648 | 9/1963 | Fisher ........................................ 119/29 |
| 3,198,173 | 8/1965 | Fisher ........................................ 119/29 |
| 3,830,202 | 8/1974 | Garrison ................................... 119/702 |
| 4,802,444 | 2/1989 | Markham et al. ....................... 119/702 |
| 5,191,856 | 3/1993 | Gordon ................................... 119/29.5 |
| 5,560,320 | 10/1996 | Plunk ....................................... 119/709 |
| 5,647,302 | 7/1997 | Shipp ....................................... 119/709 |

OTHER PUBLICATIONS

"Recipe for the Perfect Dog" brochure.

Primary Examiner—Thomas Price
Attorney, Agent, or Firm—Fields and Johnson, P.C.

[57] ABSTRACT

A pet toy has an elongated hollow body extending along a longitudinal axis with first and second spaced bulbous sections, each having a side wall of substantially constant cross-section throughout. The first and second sections each include respective first and second openings defining respective first and second diameters. A center section has an inner surface forming a center opening of a third diameter which is less than at least one of the first and second diameters. The center section interconnects the first and second bulbous sections. A plurality of longitudinally spaced annular ribs extend around the periphery of the bulbous sections forming grooves to facilitate an animal gripping the toy with its teeth. At least one of the bulbous ends has an opening with a diameter greater than the diameter of the center section so that a knot of a pull rope extending through the center of the pet toy will pass through the opening in the bulbous section but will not pass through the center section. Edible food treats can be placed in the pet toy through the opening(s) in the respective bulbous sections and center section which can be removed by the pet biting down on the pet toy and deforming the side wall. When the teeth of the animal deform an end of the pet toy, the ribs deflect inwardly to clean the teeth and/or massage the gums. In a second embodiment, the pet toy has a hollow core of substantially constant cross-section.

10 Claims, 4 Drawing Sheets

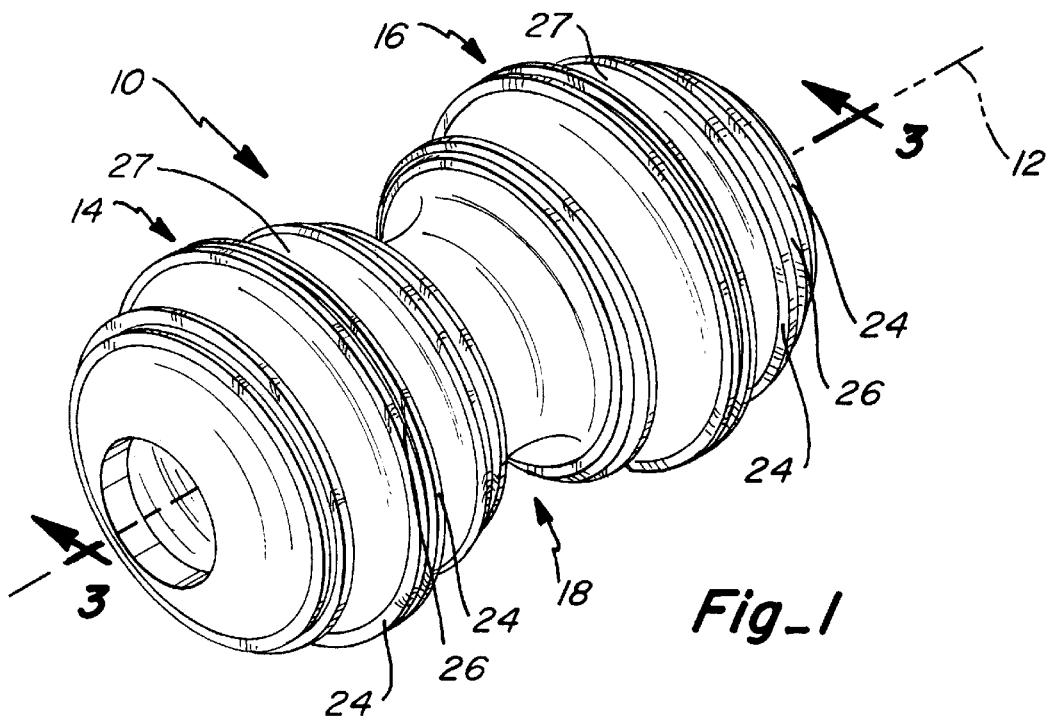
Fig_1
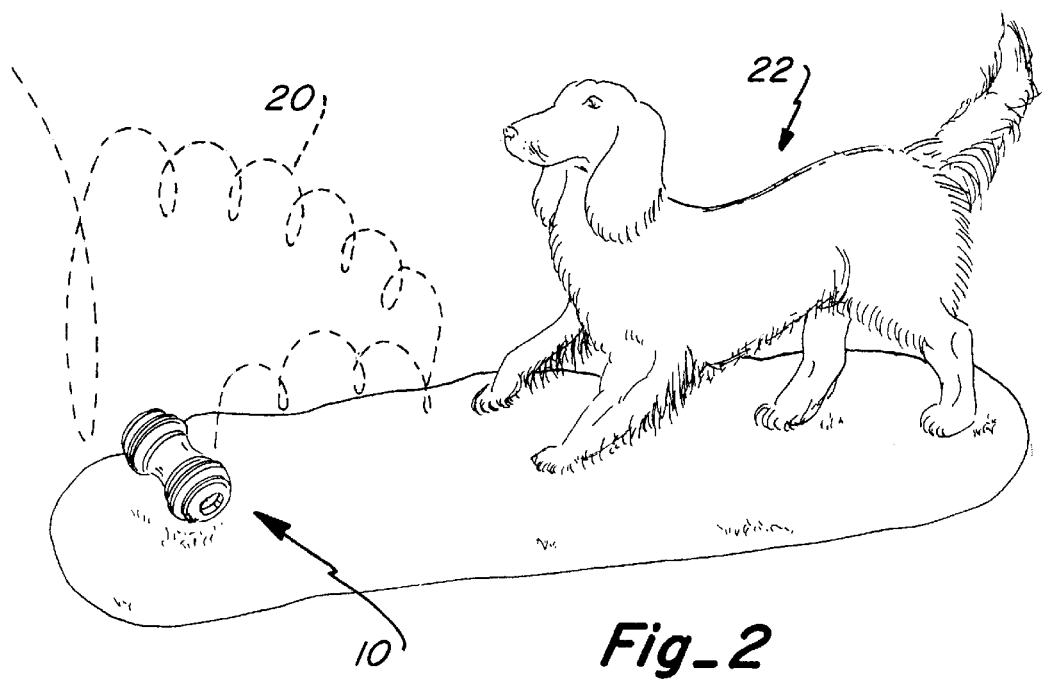
Fig_2

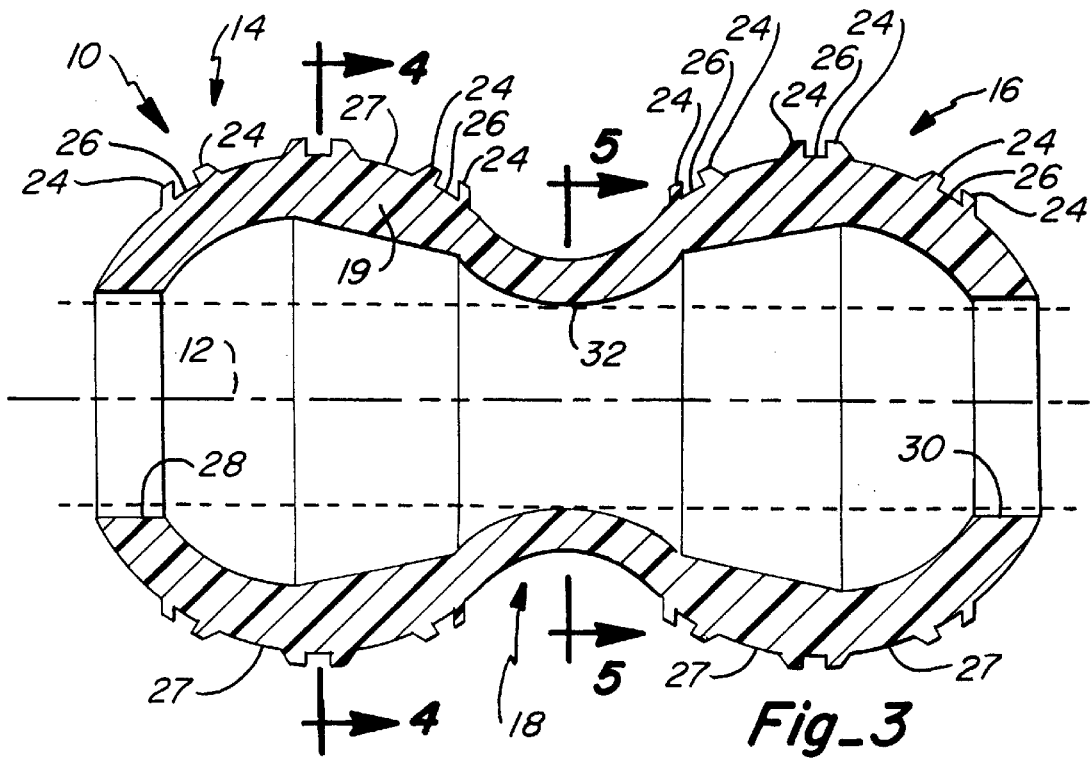
Fig_3
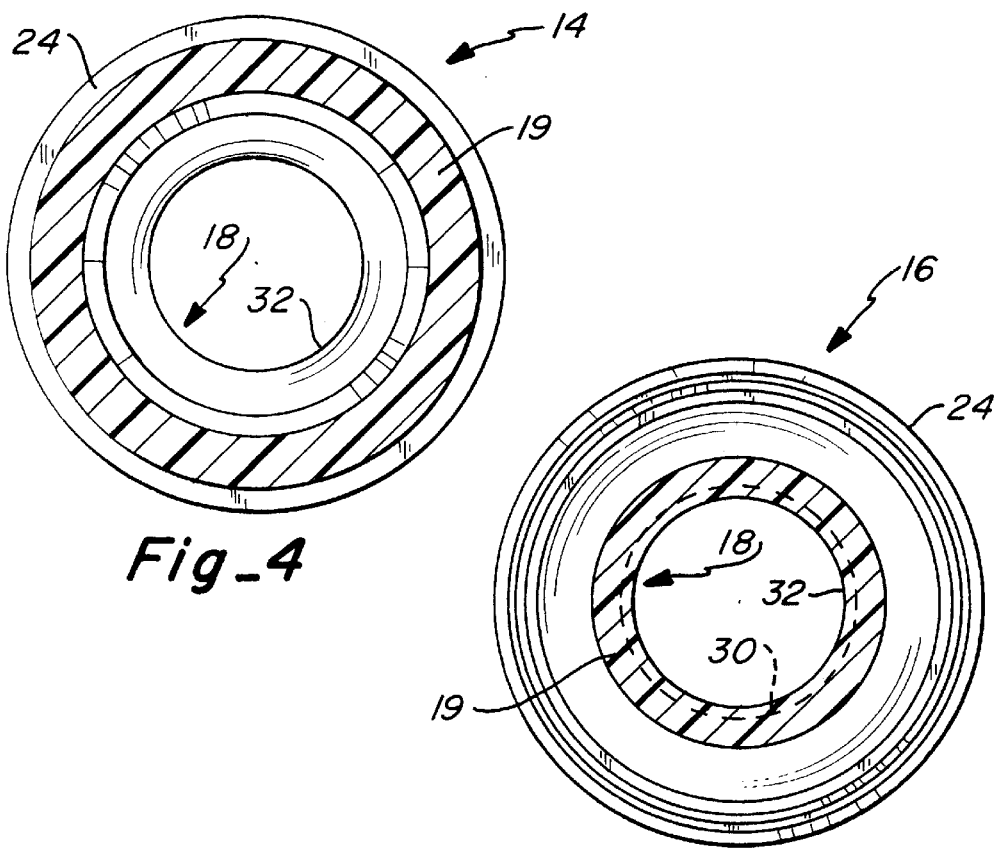
Fig_4
Fig_5

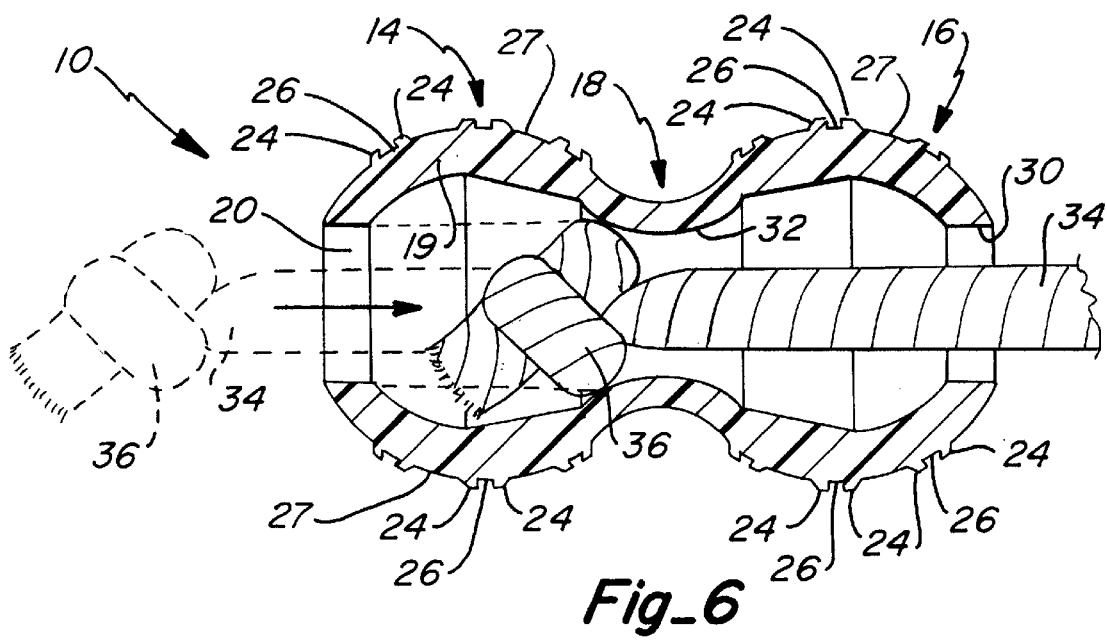
Fig_6
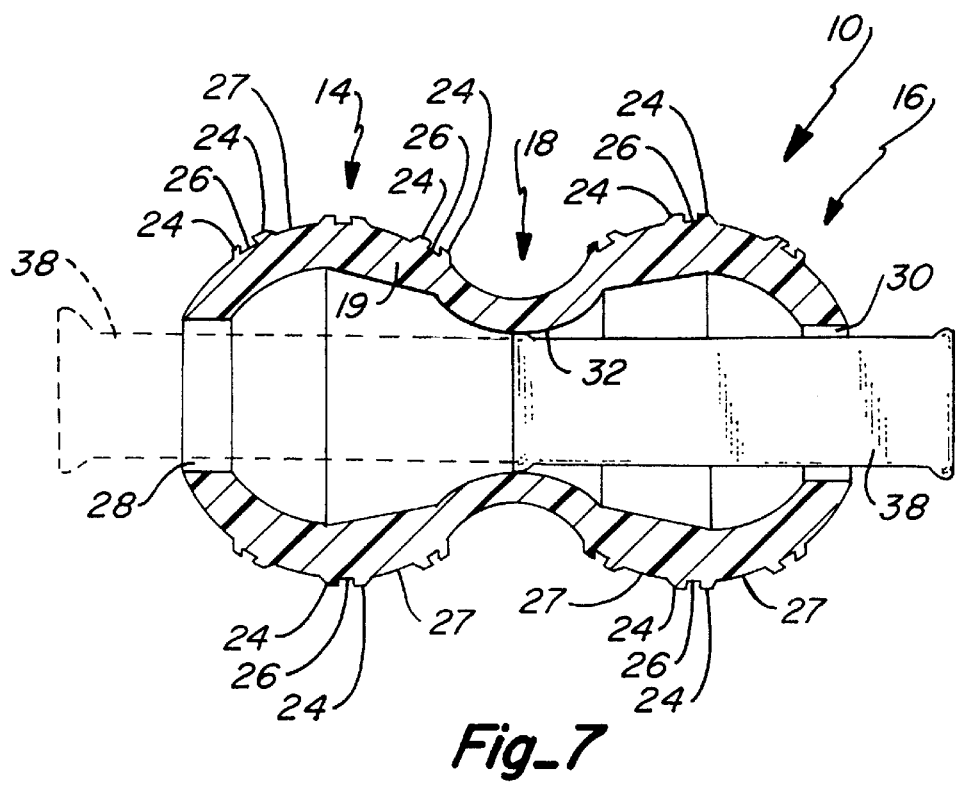
Fig_7

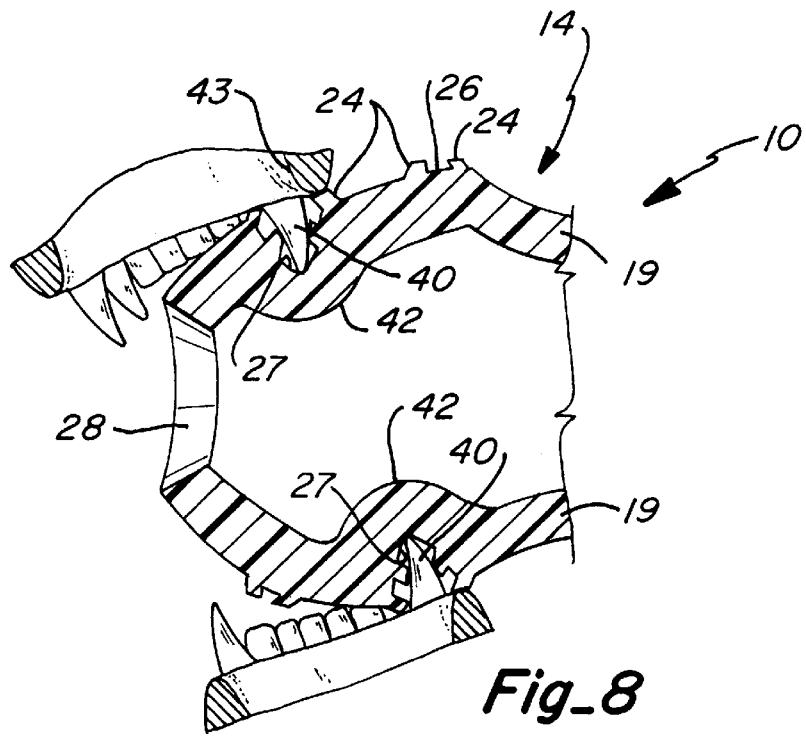
Fig_8
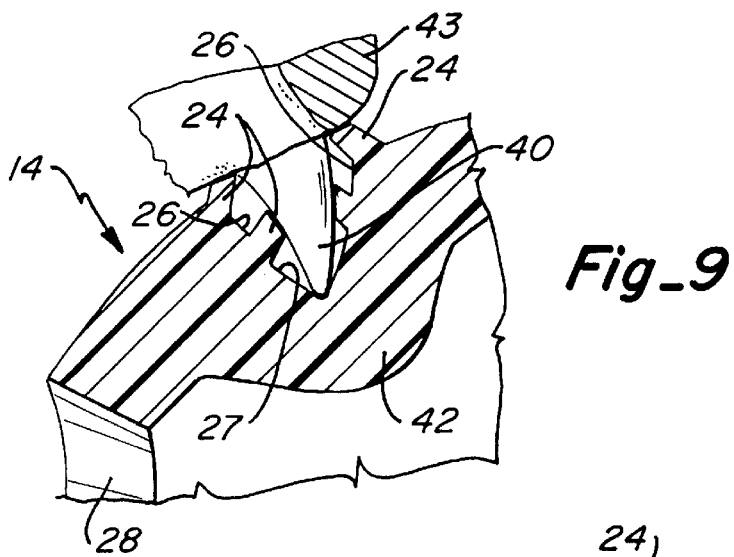
Fig_9
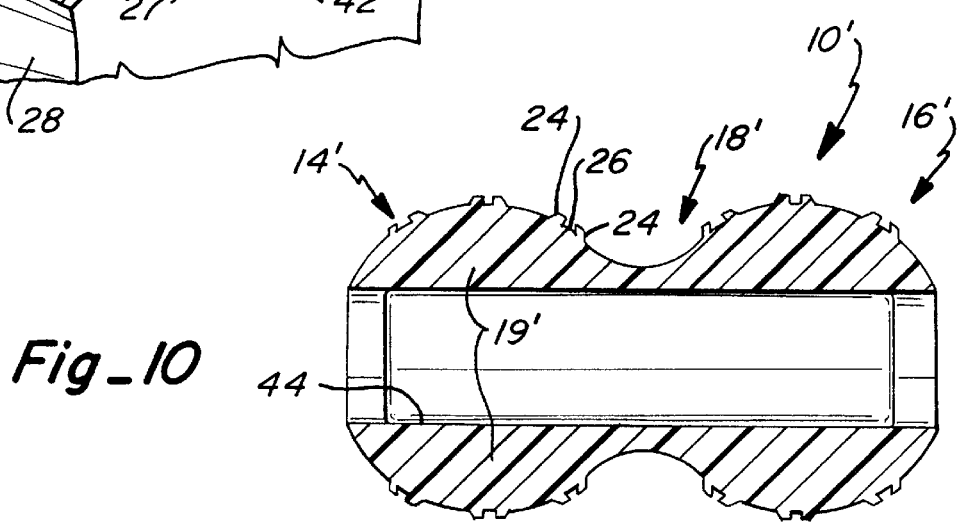
Fig_10

BOUNCING PET TOY

TECHNICAL FIELD

This invention relates to a pet toy and, more particularly, to a pet toy which is flexible, has an irregular shape, and a hollow core causing it to bounce in an irregular fashion when thrown on the ground or the floor. The hollow core provides a passageway for attaching a pull rope and/or for receiving an edible food treat.

BACKGROUND ART

Play toys for animals, and particularly dogs, have been available for years in various sizes and configurations, each designed to provide jaw exercise and to enhance the animals' interest in playing with the toy. Enhanced interest in the toy may occur by giving it a physical configuration which will bounce in odd directions when tossed onto the floor or ground. Also interest in a pet toy can be enhanced by providing food treats in the pet toy. Many pet toys provide one or both of these features with varying success. Examples of such toys are found in U.S. design Pat. Des. No. 234,789 and Des. No. 234,790 to Rosenberg, each entitled "Sounding Toy For Pet Animal", and U.S. design Pat. Des. No. 256,958 to Markham, entitled "Pet Toy". This latter pet toy is hollow and has an irregular outer configuration and provides substantial jaw exercise for the animal.

A further example of such prior art pet toys is U.S. Pat. Re. No. 34,352 to Markham, entitled "Therapeutic Pet Toy". This pet toy has an irregular outer configuration and a central core extending therethrough. A series of longitudinally spaced peripheral grooves are provided which have inwardly projecting lips for cleaning the teeth of the animal. The hollow core facilitates deformation of the pet toy with the animal bites into the grooves. The resistance of the pet toy to deformation provides exercise for the animal's jaw.

DISCLOSURE OF THE INVENTION

In accordance with this invention, a pet toy is provided for entertaining an animal and providing jaw exercise. In one form of the invention the pet toy has an elongated hollow body extending along a longitudinal axis having first and second ends and a side wall of substantially constant cross-section throughout. A first bulbous section has a first opening defining a first inner diameter, the first bulbous section forming the first end of the elongated body. A second bulbous section has a second opening defining a second inner diameter, the second bulbous section forming the second end of the elongated hollow body and spaced from the first bulbous section. A center section is provided which extends along the longitudinal axis between the first and second bulbous sections and is connected at opposite ends to both sections. The first and second openings form one continuous opening through the pet toy. The center section surrounds a narrowed diameter opening portion which lies between the first and second bulbous sections and has a third inner diameter. A plurality of spaced ribs may extend around the periphery of the pet toy to facilitate an animal gripping the pet toy with its teeth.

More particularly, at least one of the bulbous sections has an opening having a diameter greater than the inner diameter of the center section so that a knot of a pull rope extending through the center of the pet toy will pass through the opening in the bulbous section but will not pass through the center section. Also, edible food treats can be placed in the pet toy through the opening(s) in the respective bulbous sections and the center section.

In another form of the invention, an elongated hollow body extends along a longitudinal axis and has first and second ends and a central hollow core of a substantially constant diameter. The first bulbous section has a first outer diameter and a first wall thickness forming the first end of the elongated hollow body extending along said longitudinal axis. A second bulbous section has a second outer diameter and a second wall thickness forming the second end of the elongated hollow body and is spaced from said first bulbous section. A center section lies along the longitudinal axis between and is connected to the first bulbous section and the second bulbous section. The center section has a thin deformable side wall whose outer diameter is less than at least one of the first and second outer diameters and has a third thickness which is less than at least one of the first and second thicknesses.

Additional advantages of this invention will become apparent from the detailed description of this invention taken in conjunction with the accompanying drawings.

BRIEF DESCRIPTION OF THE DRAWINGS

FIG. 1 is a perspective view of one embodiment of the pet toy of this invention;

FIG. 2 illustrates the irregular bouncing action of the pet toy when it is tossed on the ground;

FIG. 3 is a longitudinal vertical section, taken along line 3—3 of FIG. 1, showing the uniform cross-section of the pet toy and the relationship of the respective diameters of the bulbous sections and the center section;

FIG. 4 is a vertical section, taken along line 4—4 of FIG. 3;

FIG. 5 is a vertical section, taken along line 5—5 of FIG. 3;

FIG. 6 is a longitudinal vertical section through the pet toy of this invention showing the insertion and use of a pull rope therewith;

FIG. 7 is a longitudinal vertical section through the pet toy of this invention showing the insertion of an edible food treat therein;

FIG. 8 is a fragmentary vertical section of the left end of the pet toy showing a jaw of an animal biting down on the pet toy so that the ribs of the pet toy engage the sides of the teeth and the gums of the animal;

FIG. 9 is a fragmentary enlarged vertical section showing details of the engagement of the teeth and gums of the animal with the ribs; and FIG. 10 is a longitudinal vertical section of another embodiment of the pet toy of this invention.

BEST MODE FOR CARRYING OUT THE INVENTION

As best seen in FIGS. 1 and 3, the pet toy 10 of this invention has an elongated body extending along axis 12 wherein the elongated body includes a first bulbous section 14 having first and second ends and a second bulbous section 16 having first and second ends and spaced from the first bulbous section 14. These bulbous sections are interconnected by a center section 18 which also has first and second ends. As clearly seen in FIG. 3, the side wall 19 defines a cross-section which is substantially uniform throughout. This uniform cross-section facilitates the irregular bouncing action of the pet toy when tossed so that it bounces along an irregular path, such as path 20 shown in FIG. 2. This creates interest in the pet toy by an animal such as dog 22.

Conveniently, each bulbous section 14 and 16 has a plurality of pairs of spaced ribs 24, each pair forming a first narrow groove 26 therebetween to facilitate an animal gripping the pet toy with its teeth. A second wider groove 27 is formed between the pairs of ribs 26, as shown. Conveniently, the animal can deform the pet toy by biting down on the bulbous sections.

Bulbous section 14 has an outer diameter and bulbous section 16 has a similarly sized outer diameter. In the embodiment shown, although the outer diameters are the same, it will be understood that one of ordinary skill in this art could construct a pet toy having bulbous sections of different diameters to modify the bouncing characteristics of the pet toy. The center section 18 has a third outer diameter which is less than at least one the first and second outer diameters. Center section 18 is positioned along longitudinal axis 12 between bulbous section 14 and bulbous section 16 and is connected to both.

Additionally, bulbous section 14 has an opening 28 at its first or outer end. This opening 28 defines a first inner diameter. Bulbous section 16 has an opening 30 at its first or outer end. This opening 30 defines a second inner diameter. The first and second inner diameters are greater than a third inner diameter of center section 18 which forms a surface which defines opening 32 therethrough.

This arrangement provides several advantages. First, as shown in FIG. 6, when used with a pull rope 34 having a knot 36 at one end thereof, the knot is sized to be small enough to pass through an opening in a bulbous section, such as opening 28 in bulbous section 14, but is larger in diameter than the third inner diameter of opening 32 in center section 18. Accordingly, the knot engages the interior surface of center section 18 which serves as an anchor point for knot 36. The free end of rope 34 may then extend through opening 30 in bulbous section 16 so that it can serve as a pull rope. It is readily apparent that the direction of the rope can be reversed so that knot 36 passes through opening 30 of bulbous section 16 and bears against the opposite side of the interior surface of center section 18 as an anchor with the rope 34 passing through opening 28 in bulbous section 14. Furthermore, it will be understood that one of openings 28 and 30 could be smaller in diameter than the diameter of knot 36 so long as the diameter of the other of bulbous sections 28 and 30 is larger than the diameter of the rope. In this instance, the rope could be inserted through the pet toy in only one direction.

A second advantage is that an edible pet treat 38, as shown in FIG. 7, can be inserted through either opening 28 of bulbous section 14 or opening 30 of bulbous section 16 but is resiliently gripped by the interior surface of center section 18 defined by opening 32. Once the animal has chewed off the end of edible food treat 38, the remaining portion of the treat can be released by the animal chewing on the pet toy and deforming it so as to crush or dislodge edible food treat 38 from within opening 32. Thus, the interest of the animal in the pet toy of this invention can be maintained over an extended period of time because of the effort required to remove the entire edible treat from the pet toy.

Also, the edible treat can be longer than the length of the pet toy and extent out of both openings 28 and 30 while being resiliently held intermediate its ends by the interior surface defined by opening 32. After chewing off the ends of the treat, the remainder of the treat which is inside the pet toy will be released by the animal chewing on the pet toy to deform it so that the remainder of the treat is crushed and will fall out the ends of the pet toy. Alternatively, the treat can be shorter than the pet toy and positioned within it so that neither end is exposed. In order to remove any of treat in this instance, the animal must deform the pet toy by chewing on it to crush the treat so that it falls out of the ends of the pet toy.

By turning to FIGS. 8 and 9, another advantage of this invention can be seen. Conveniently, the ribs 24 function to clean the sides of the teeth of the animal when it bites down on bulbous section 14. When teeth 40 bite down on groove 27, they deflect area 42 on the opposite sides of side wall 19 inwardly so that the innermost rib 24, with respect to wider groove 27, of adjacent pairs of ribs 24 engage the opposite sides of tooth 40 thus effecting the cleaning action. The deflection of area 42 also allows the gums 43 to be massaged by the outermost ribs 24, with respect to wider groove 27, of adjacent pairs of ribs 24 at the same time tooth 40 is being cleaned by the innermost ribs 24. The same cleaning and massaging action will occur when the animal bites down on bulbous section 16 as well.

Another embodiment is shown in FIG. 10 wherein pet toy 10' includes bulbous sections 14' and 16' and center section 18' have a longitudinal center bore or opening 44 of substantially uniform cross-section. This pet toy will function similarly to that of FIGS. 1–7 except that bulbous sections 14' and 16' will be less easily deflected by the teeth of the animal. However, by changing the elasticity of the material from which the pet toy is made, it is possible to compensate for the greater thickness of the side wall 19' at bulbous sections 14' and 16'.

From the foregoing, the advantages of this invention are readily apparent. An elongated hollow pet toy has been provided which has spaced bulbous sections joined by a center section wherein the cross-section of the elongated body wall is substantially uniform throughout. This exterior configuration together with the hollow interior cause the pet toy to bounce in an irregular fashion when thrown on the floor or ground. The bulbous sections can have the same diameters or different diameters. In either case, an opening is provided in the end of each bulbous section and at least one such opening is of a greater diameter than that of the opening in the center section so as to provide an anchoring surface for the knot on a pull rope with the pull rope extending through the other of such openings or to resiliently hold an edible food treat which is inserted through one of the openings in the bulbous end sections. Peripheral ribs are spaced longitudinally along the bulbous sections of the pet toy to form grooves so that the animal can grasp the pet toy with its teeth. In one embodiment the pet toy has a thin wall of substantially constant cross-section which enhances the bouncing characteristics of the pet toy. When the teeth of the animal bite down on the pet toy, the side walls deform so that the ribs deflect inwardly to clean the teeth and/or massage the gums. In a second embodiment, the pet toy has a hollow core of substantially uniform diameter.

This invention has been described in detail with reference to particular embodiments thereof, but it will be understood that various other modifications can be effected within the spirit and scope of this invention.

What is claimed is:

1. A pet toy for entertaining an animal and providing jaw exercise, teeth cleaning and/or gum massaging for the animal, said pet toy comprising:

an elongated hollow body, having an outer peripheral surface, extending along a longitudinal axis and having first and second ends and a side wall of substantially constant cross-section throughout; and a plurality of longitudinally spaced pairs of annular ribs extending around said outer peripheral surface to facilitate the animal gripping said pet toy with its teeth, each said pairs of ribs defining a first narrow groove therebetween and adjacent pairs of ribs defining a second wider groove therebetween wherein the inner rib of each pair of ribs with respect to said second wider groove are disposed for engagement with the teeth and the outer rib of each pair of ribs with respect to said second wide groove are disposed for engagement with the gums when the animal bites down on said second wider groove.

2. A pet toy, as claimed in claim 1, said elongated hollow body further including:

a first bulbous section having a first opening defining a first inner diameter and forming said first end of said elongated hollow body and forming said first end of said elongated hollow body extending along said longitudinal axis;

a second bulbous section having a second opening defining a second inner diameter and forming said second end of said elongated hollow body extending along said longitudinal axis and spaced from said first bulbous section; and a center section extending along said longitudinal axis between and connected to said first bulbous section and said second bulbous section, said center section having a third inner diameter which forms an inner surface defining a center opening said third inner diameter being less than at least one of said firsts and second inner diameters.

3. A pet toy, as claimed in claim 2, wherein:

said first and second inner diameters are different.

4. A pet toy, as claimed in claim 2, wherein:

said first and second inner diameters are the same.

5. A pet toy for entertaining an animal and providing jaw exercise, teeth cleaning and/or gum massaging for the animal, said pet toy comprising:

an elongated hollow body extending along a longitudinal axis and having first and second ends and a side wall of substantially constant cross-section throughout;

a first bulbous section having a first opening defining a first inner diameter and forming said first end of said elongated hollow body extending along said longitudinal axis;

a second bulbous section having a second opening defining a second inner diameter and forming said second end of said elongated hollow body extending along said longitudinal axis and spaced from said first bulbous section;

a center section extending along said longitudinal axis between and connected to said first bulbous section and said second bulbous section, said center section having a third inner diameter which forms an inner surface defining a center opening said third inner diameter being less than at least one of said first and second inner diameters; and a rope extending through said elongated hollow body along said longitudinal axis having a fourth diameter smaller than either said first and second inner diameters and having an end with a knot formed therein which knot has a fifth diameter which is smaller than said at least one of said first and second inner diameters but is larger than said third inner diameter so that said knot can pass through said at least one of said first and second inner diameters but not pass through said third inner diameter and engages said inner surface of said center section as an anchor wherein said rope extends through the other of said at least one of said first and second openings to serve as a pull for said pet toy.

6. A pet toy for entertaining an animal and providing jaw exercise, teeth cleaning and/or gum massaging for the animal, said pet toy comprising:

an elongated hollow body extending along a longitudinal axis and having first and second ends and a side wall of substantially constant cross-section throughout;

a first bulbous section having a first opening defining a first inner diameter and forming said first end of said elongated hollow body extending along said longitudinal axis;

a second bulbous section having a second opening defining a second inner diameter and forming said second end of said elongated hollow body extending along said longitudinal axis and spaced from said first bulbous section;

a center section extending along said longitudinal axis between and connected to said first bulbous section and said second bulbous section, said center section having a third inner diameter which forms an inner surface defining a center opening said third inner diameter being less than at least one of said first and second inner diameters; and an edible animal treat extending through and resiliently gripped in said center opening.

7. A pet toy for entertaining an animal and providing jaw exercise, teeth cleaning and/or gum massaging for the animal, said pet toy comprising:

an elongated hollow body extending along a longitudinal axis and having first and second ends and a side wall of substantially constant cross-section throughout;

a first bulbous section having a first opening defining a first inner diameter and forming said first end of said elongated hollow body extending along said longitudinal axis;

a second bulbous section having a second opening defining a second inner diameter and forming said second end of said elongated hollow body extending along said longitudinal axis and spaced from said first bulbous section;

a center section extending along said longitudinal axis between and connected to said first bulbous section and said second bulbous section, said center section having a third inner diameter which forms an inner surface defining a center opening said third inner diameter being less than at least one of said first and second inner diameters; and a first edible animal treat extending through and resiliently gripped in said first opening; and a second edible animal treat extending through and resiliently gripped in said second opening.

8. A pet toy for entertaining an animal and providing jaw exercise, teeth cleaning and/or gum massaging for the animal, said pet toy comprising:

an elongated hollow body extending along a longitudinal axis and having first and second ends and a side wall of substantially constant cross-section throughout;

a first bulbous section having a first opening defining a first inner diameter and forming said first end of said elongated hollow body extending along said longitudinal axis;

a second bulbous section having a second opening defining a second inner diameter and forming said second end of said elongated hollow body extending along said longitudinal axis and spaced from said first bulbous section;

a center section extending along said longitudinal axis between and connected to said first bulbous section and said second bulbous section, said center section having a third inner diameter which forms an inner surface defining a center opening said third inner diameter being less than at least one of said first and second inner diameters; and an edible animal treat having a length greater than that of said elongated hollow body, said edible food treat extending through and resiliently gripped in said first and second openings and said center opening.

9. A pet toy for entertaining an animal and providing exercise, teeth cleaning and/or gum massaging for the animal, said pet toy comprising:

an elongated hollow body extending along a longitudinal axis and having first and second ends and a central hollow core of substantially constant diameter;

a first bulbous section extending along said longitudinal axis having a first opening defining a first diameter and a first wall thickness forming said first end of said elongated hollow body;

a second bulbous section extending along said longitudinal axis and spaced from said first bulbous section, said second bulbous section having a second opening defining a second diameter and a second wall thickness forming said second end of said elongated hollow body;

a center section extending along said longitudinal axis between and connected to said first bulbous section and said second bulbous section, said center section having a thin deformable side wall and an inner surface forming a center opening of a third diameter which is less than at least one of said first and second diameters, said thin deformable side wall having a third thickness which is less than at least one of said first and second thicknesses and a plurality of longitudinally spaced pairs of annular ribs extending around said outer peripheral surface to facilitate the animal gripping said pet toy with its teeth, each said pairs of ribs defining a first narrow groove therebetween and adjacent pairs of ribs defining a second wider groove therebetween wherein the inner rib of each pair of ribs with respect to said second wider groove are disposed for engagement with the teeth and the outer rib of each pair of ribs with respect to said second wide groove are disposed for engagement with the gums when the animal bites down on said second wider groove.

10. A pet toy, as claimed in claim 9, wherein:

said first and second wall thicknesses are equal.

* * * * *